United States Patent
Melis et al.

(10) Patent No.: US 7,056,125 B2
(45) Date of Patent: Jun. 6, 2006

(54) END CONNECTION DEVICE FOR AN OPERATING CABLE, WITH SYSTEM FOR ENSURING CORRECT ASSEMBLY

(75) Inventors: Salvatore Melis, Rivoli (IT); Angelo Tancredi, Turin (IT)

(73) Assignee: Sila Holding Industriale S.p.A., Nichelino (IT)

( * ) Notice: Subject to any disclaimer, the term of this patent is extended or adjusted under 35 U.S.C. 154(b) by 0 days.

(21) Appl. No.: 10/847,347

(22) Filed: May 18, 2004

(65) Prior Publication Data
US 2005/0008429 A1    Jan. 13, 2005

(30) Foreign Application Priority Data
May 19, 2003    (IT)    .......................... TO2003A0362

(51) Int. Cl.
*H01R 39/00*    (2006.01)
*H01R 41/00*    (2006.01)
(52) U.S. Cl. .......................................... 439/8; 403/133
(58) Field of Classification Search .................... 439/8; 403/122, 129, 133, 27, 473; 74/473
See application file for complete search history.

(56) References Cited

U.S. PATENT DOCUMENTS

| | | | | |
|---|---|---|---|---|
| 4,163,617 A | * | 8/1979 | Nemoto | ....................... 403/132 |
| 4,318,627 A | * | 3/1982 | Morin | ......................... 403/133 |
| 4,478,531 A | | 10/1984 | Levinson et al. | ............. 403/77 |
| 5,265,495 A | * | 11/1993 | Bung et al. | ................. 74/502.6 |
| 6,109,816 A | * | 8/2000 | Iwasaki | ....................... 403/135 |
| 6,692,176 B1 | * | 2/2004 | Fladhammer | .................. 403/2 |
| 6,758,622 B1 | * | 7/2004 | Burton | .......................... 403/7 |
| 6,837,716 B1 | * | 1/2005 | Brazas | .......................... 439/8 |
| 2002/0146277 A1 | | 10/2002 | Kuroda | ....................... 403/135 |

FOREIGN PATENT DOCUMENTS

| | | |
|---|---|---|
| DE | 2441914 A | 11/1976 |
| DE | 19813721 A1 | 7/1999 |
| DE | 198 13 721 A1 | 10/1999 |
| EP | 0589550 A1 | 3/1994 |
| EP | 0896162 A | 10/1999 |

* cited by examiner

*Primary Examiner*—Michael C. Zarroli
(74) *Attorney, Agent, or Firm*—Sughrue Mion, PLLC

(57) ABSTRACT

The device, suitable for connecting one end of an operating cable to a control member, particularly a control lever of a vehicle gearbox, includes: an outer body to be attached to the operating cable, having a through opening; and a bush arranged to be inserted into the through opening of the body to be locked inside it in a final assembled position and having a snap-action spherical seat for receiving a ball head of a pin to be connected to the control member. The spherical seat is provided with an elastically deformable element formed integrally with the bush and extending from the top of the seat in such a way as to elastically oppose the insertion of the ball head into the seat.

8 Claims, 3 Drawing Sheets

END CONNECTION DEVICE FOR AN OPERATING CABLE, WITH SYSTEM FOR ENSURING CORRECT ASSEMBLY

FIELD OF THE INVENTION

The present invention relates to an end connection device, or terminal device, for an operating cable of the so-called push-pull type. These devices are often used, especially in the automotive field, for connecting one end of an operating cable to a control member, such as the control lever of the gearbox of a motor vehicle.

BACKGROUND OF THE INVENTION

The terminal device must allow a jointed connection between the end of the cable and the control member. For this purpose the terminal device, which is usually assembled on the control member, for example at one end of the gear shift lever, has a spherical seat into which the ball head of a pin attached to one end of the operating cable is to be snap-engaged. A releasable connection between the cable and the control member is thus achieved.

German Patent Application DE 198 13 721 A1, for example, discloses a terminal device designed to reduce the force required to insert the ball head of the pin associated to the control lever into the spherical seat formed in the hollow terminal, without thereby reducing the disassembly force and so risking causing the ball head to disengage from its seat during operation. To this end, this known device comprises:

- an outer body connected to the operating cable by a connection rod and having an opening arranged perpendicularly to the rod;
- a ball headed pin assembled on the end of the control lever;
- a sleeve inserted into the opening of the outer body and having at least two first recesses and two second recesses defining a first position and a second position, respectively;
- a bush slidably mounted in the sleeve and having a spherical seat for accommodating the ball head of the pin; the bush being provided with elastic catches for engaging in the recesses of the sleeve in order to lock the bush in the abovementioned two positions inside the cavity of the terminal body.

With the bush in the first position, the spherical seat can expand, because of the presence of slits, to snap-engage the ball head of the pin. When the bush is moved into the second position, the whole portion of bush forming the spherical seat is contained in the sleeve inside the terminal body, and is therefore now unable to expand to allow the ball head to disengage from its seat.

According to this known arrangement, therefore, the terminal can adopt a pre-assembled condition, in which the ball head is received in the associated seat in the bush, and the bush is held in the terminal body by its own catches engaging in the abovementioned first recesses. During assembly, however, this represents a disadvantage, because if a terminal is left in the pre-assembled condition it can erroneously be assumed by the operator to be in the final assembled condition, with the inevitable consequence that the cable will come out of the control member as soon as the cable is operated in normal use.

SUMMARY OF THE INVENTION

It is an object of the present invention to provide an end connection device for an operating cable that will retain the advantages of the prior art discussed above but that cannot be mistakenly left in the pre-assembled condition.

This and other objects are achieved according to the invention by virtue of an end connection device having the features defined in claim 1.

BRIEF DESCRIPTION OF THE DRAWINGS

Further features and advantages of the device according to the invention will result clearly from the detailed description which follows, given purely by way of non-limiting example with reference to the accompanying drawings, in which.

DETAILED DESCRIPTION OF THE PREFERRED EMBODIMENT

Figure 1:
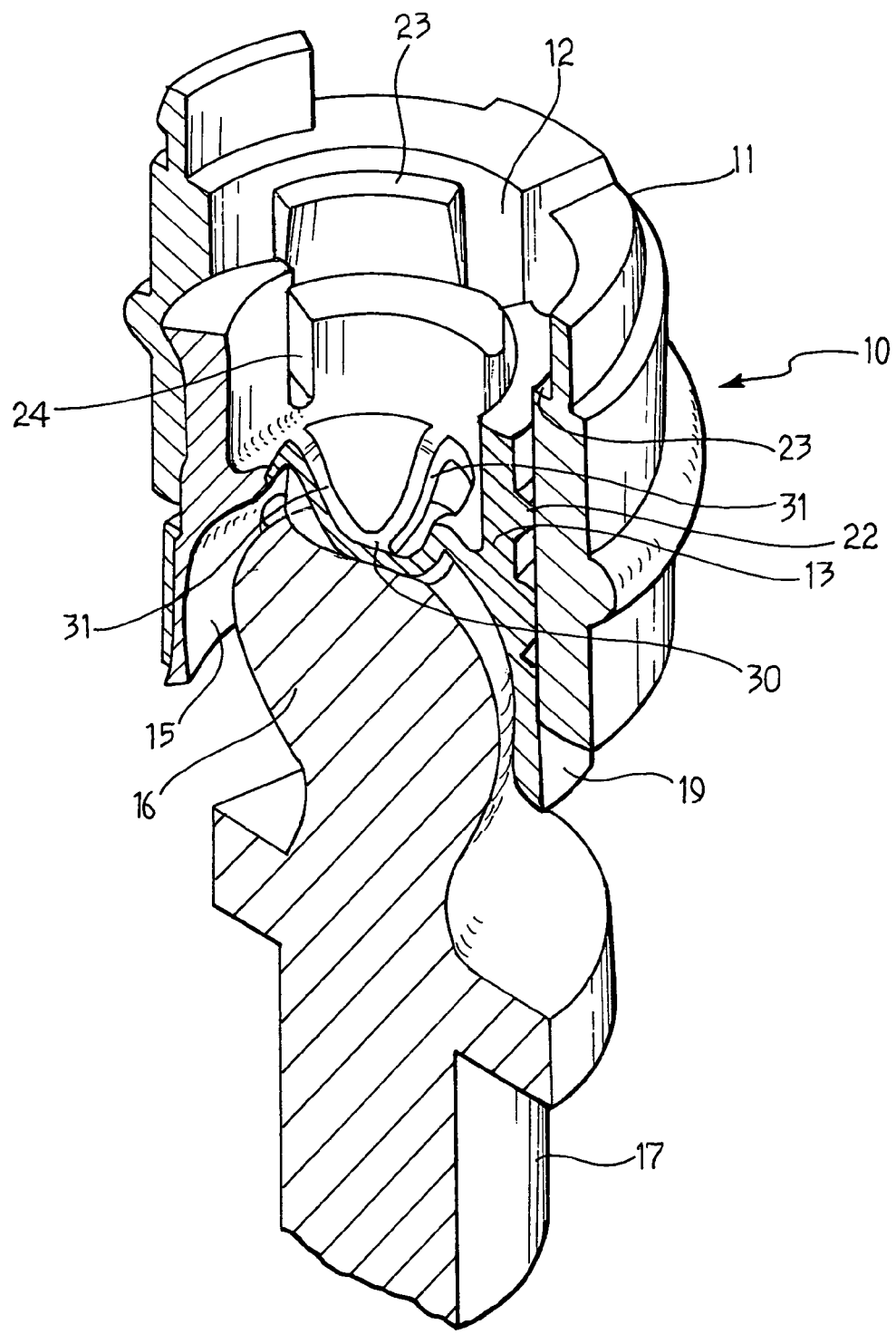
FIG. 1 is a perspective view, sectioned on an axial plane, showing part of an end connection device according to the invention, in the pre-assembled condition.
Figure 2:
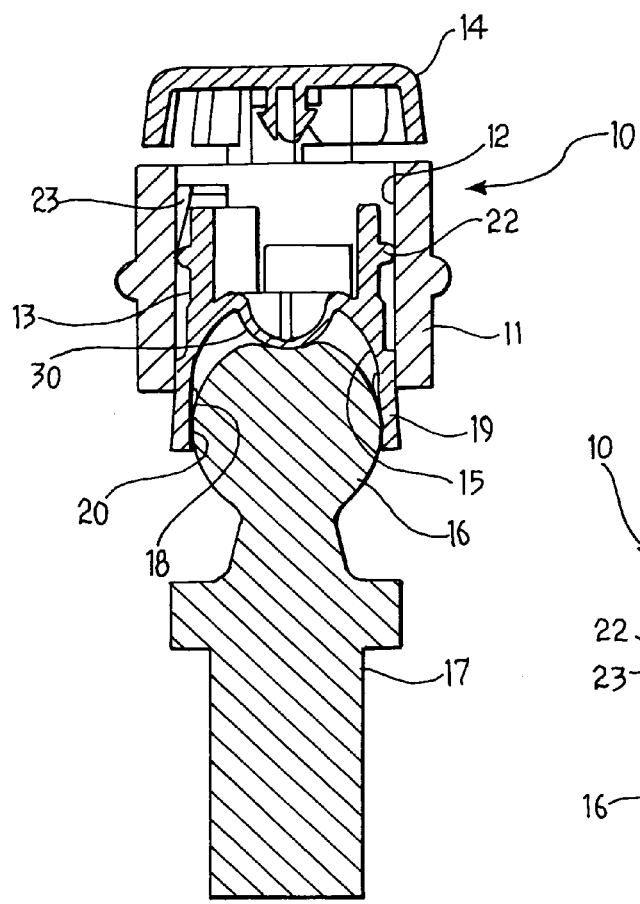
FIGS. 2 and 3 are views in axial section of the device of FIG. 1, in the pre-assembled condition and final assembled condition, respectively.
Figure 3:
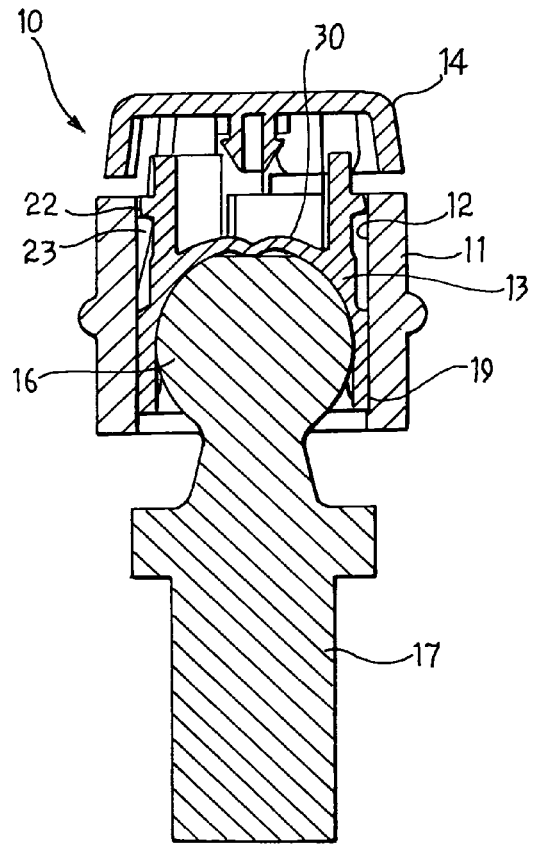
Figure 4:
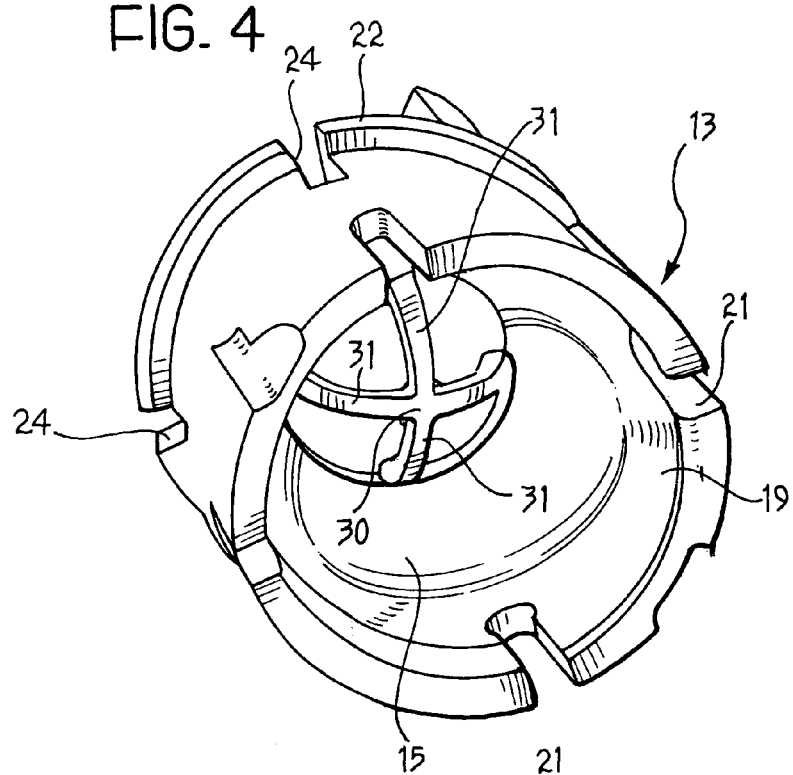
FIGS. 4 and 5 are perspective views of a bush and an outer body, respectively, that form part of a device according to the invention.
Figure 5:
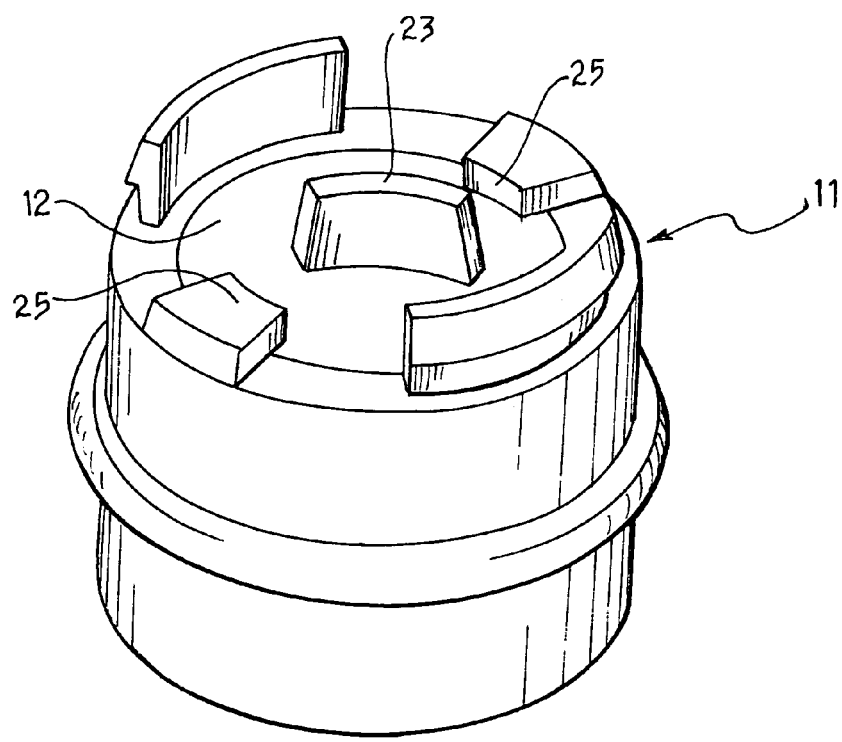

Referring to the figures, an end connection device according to the present invention is generally indicated 10. The device 10 comprises an outer body 11 intended to be connected in a manner known per se, for example by a connection rod (not shown), to one end of an operating cable (also not shown). The body 11, which is preferably formed by plastic moulding, has a central through opening 12 suitable for receiving at a (lower) end a bush 13 and closed at the other (upper) end by a cap or cover 14 (shown in FIGS. 2 and 3). The body 11 is advantageously over-moulded onto the connection rod, which is generally made of metal and is arranged perpendicular to the axis of the opening 12.

The bush 13 has at its lower end a spherical seat 15 suitable for receiving and snap-engaging, in a manner known per se, a ball head 16 of a pin 17 attached to a control member (not shown), such as the control lever of a motor vehicle gearbox. The seat 15 is bounded at its lower end by a circumferential edge 18 of slightly smaller diameter than that of the ball head 16. Below the circumferential edge 18, the bush 13 forms a lead-in portion 19 which has a tapering inner surface 20. In order to insert the head 16 into the seat 15 the lead-in portion 19 must therefore be expanded elastically, particularly at the circumferential edge 18. For this purpose a series of notches 21 are formed in the portion 19 which are oriented vertically, that is in the direction in which the head 16 is inserted into the bush 13, thereby dividing the portion 19 into elastically deformable segments.

An upper portion of the bush 13 forms an annular protuberance 22 projecting radially from the outer surface of the bush for snap-engaging with a series of ramp-shaped projections 23 provided on the internal surface of the cavity 12 of the body 11. Once again, there are formed in the upper portion of the bush 13, which forms the protrusion 22, a series of notches 24 oriented vertically, that is in the direction in which the bush slides into the cavity 12, thereby dividing this portion into elastically deformable segments. In this way, when the bush 13 is pushed up into the cavity 12, starting from the position shown in FIG. 2, the deformable segments of the upper portion of the bush bend radially inwards due to the protuberance 22 sliding over the ramp surface of the projections 23 on the body 11, until the protuberance moves past the projections 23. In this position (FIG. 3), corresponding to the assembled condition of the device, the bush 13 is locked axially downwards in the cavity 12, as well as the ball head 16 is locked axially in the seat 15 of the bush.

The body 11 also forms at the top end of the cavity 12 a series of protrusions 25 projecting radially inwards and defining an upper limit position for the bush 13 in cooperation with the annular protuberance 22 of the bush.

Clearly, the projections 23 on the body 11 can be formed as a single annular projection running all the way around the circumference of the cavity 12. The same applies for the protrusions 25.

In order to prevent the connection device from being erroneously left in a pre-assembled condition in which the ball head 16 is received in the seat 15, but the bush 13 is not fully inserted into the cavity 12 and therefore does not ensure that the head 16 is locked in its seat, according to the invention the bush 13 is provided with an elastically deformable element 30, which in its undeformed condition extends into the spherical seat 15 in such a way as to oppose the insertion of the ball head 16. In the illustrated embodiment, the element 30 consists of four curvilinear arms 31, substantially in the form of circular arcs, formed integrally with the bush 13, which extend radially from the top of the spherical seat 15 and are connected to each other at their lower ends. In the undeformed condition (FIG. 2) the elastic element 30 defines an upper abutment surface with which the ball head 16 comes into contact before or as soon as the latter has begun to elastically deform the lead-in portion 19 of the bush 13 by acting on the circumferential edge 18.

The shape and dimensions of the elastic element 30 may of course be varied from those illustrated, provided the element is stiff enough to oppose the insertion of the ball head 16 into the seat 15 unless sufficient force is exerted on the head 16 to move the head and bush assembly into the final assembled position described above, in which the protuberance 22 on the bush snap-engages with the projections 23 of the body 11.

Naturally, the principle of the invention remaining unchanged, embodiments and details of construction may vary considerably from those described and illustrated purely by way of non-restrictive example.

What is claimed is:

1. Connection device for connecting one end of an operating cable to a control member, particularly a control lever of a vehicle gearbox; the device comprising an outer body intended to be attached to the operating cable and having a cavity;

a pin intended to be connected to the control member and having a ball head; and a bush intended to be inserted into the cavity and having a snap-action spherical seat for receiving the ball head;

wherein the bush is provided at its lower end with a first elastically deformable element in the form of a circumferential edge of smaller diameter than that of the ball head, in such a manner that the circumferential edge has to be elastically expanded for allowing insertion of the ball bead into the spherical seat;

wherein the bush is further provided with a second elastically deformable element which in its undeformed condition forms an abutment surface arranged in the space enclosed by the surface of the spherical seat so as to avoid erroneous insertion of the ball head into the spherical seat.

2. The device of claim 1, wherein the second elastically deformable element is formed integrally with the bush.

3. The device of claim 1, wherein the second elastically deformable element extends from the top of the spherical seat against the direction of insertion of the ball head into the spherical seat.

4. The device of claim 3, wherein the second elastically deformable element consists of a plurality of curvilinear arms extending radially from the top of the seat and connected to each other at their lower-ends.

5. The device of claim 1, wherein the cavity is a cylindrical cavity along the axis of which the bush is slidable between a pre-assembled position, in which the bush is partially received in the cavity but not axially locked inside it, and a final assembled position, in which the bush is axially locked inside the cavity and the ball head is fully received within the spherical seat.

6. The device of claim 5, wherein the bush is provided with at least one protuberance projecting radially from its outer surface and wherein the cavity is provided with at least one ramp-shaped projection arranged to snap-engage with the at least one protuberance so as to lock axially downwards the bush in the cavity in the said final assembled position.

7. The device of claim 5, wherein the second elastically deformable element has such shape and size that it opposes the insertion of the ball head into the spherical seat until sufficient force is exerted on the ball head to move the ball head and bush assembly into the final assembled position.

8. The device of claim 1, wherein the abutment surface of the second elastically deformable element is configured in such a manner that during insertion of the ball head into the spherical seat its abutment surface comes into contact with the ball head before or as soon as this latter begins to de-form the first elastically deformable element.

* * * * *